Patented Jan. 21, 1936

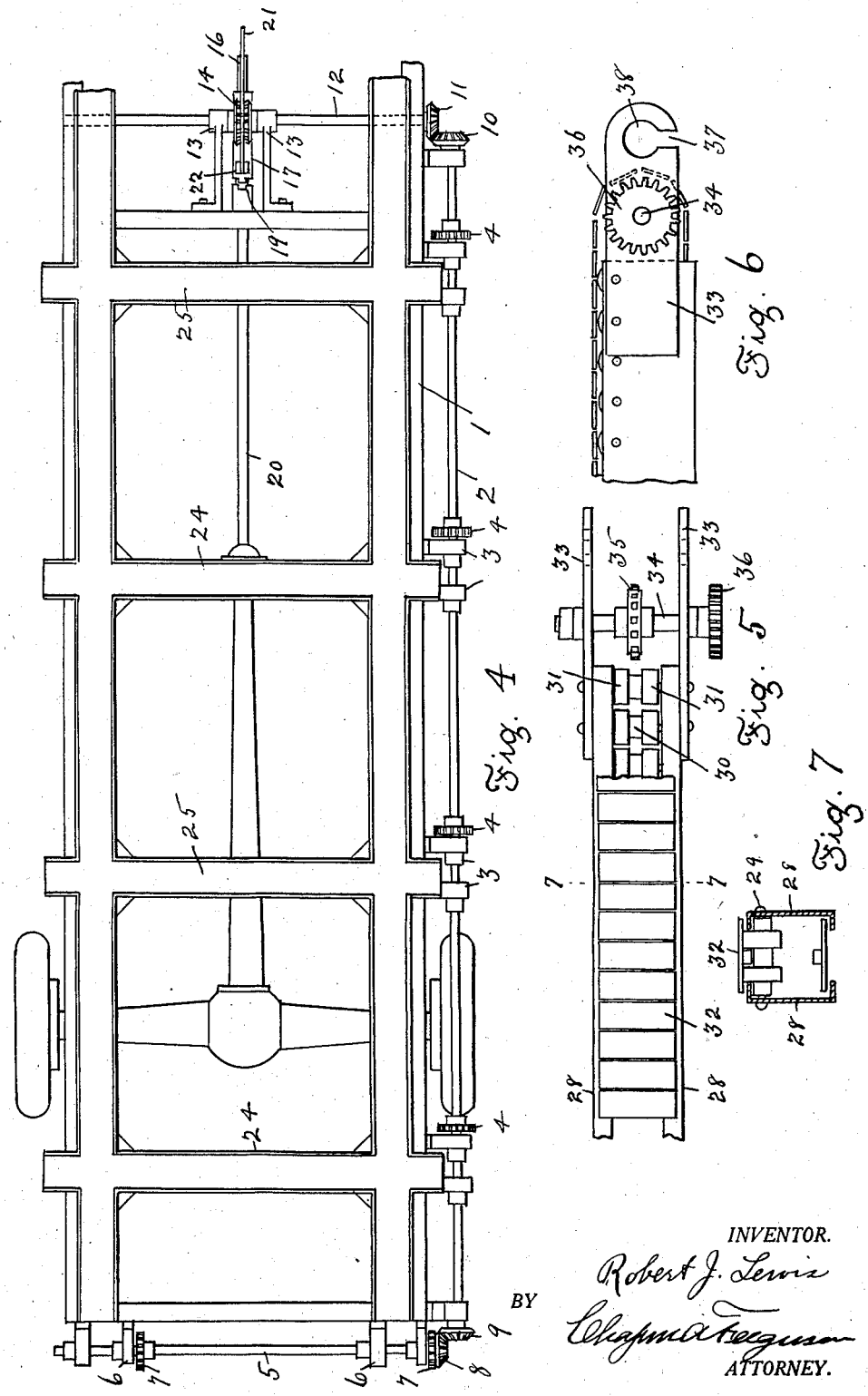

2,028,227

UNITED STATES PATENT OFFICE 2,028,227

MOTOR TRUCK

Robert J. Lewis, Baltimore, Md.

Application June 23, 1933, Serial No. 677,293

1 Claim. (Cl. 214—83)

This invention relates to an improved auto truck for carrying portable containers, such, for instance those set forth and described in an application for patent filed by me in the United States Patent Office on June 10th, 1933, Serial No. 675,262, and has for its object to provide a truck adapted to carry a number of portable containers, or bodies, and which is provided with means for readily loading and unloading said containers or bodies, either on the sidewalk, on a platform, or other convenient place.

The invention consists of the novel construction and arrangement of the parts and combination of parts hereinafter more fully set forth in the following specification and pointed out in detail in the appended claim.

In the accompanying drawings,—

Figure 1 is a side elevation of a truck having my invention applied thereto.

Figure 2 is a rear end view of Figure 1.

Figure 3 is an enlarged detail view of the clutch mechanism between the engine shaft and the differential shaft.

Figure 4 is a plan view of Figure 1.

Figure 5 is an enlarged detail plan view, partly broken away, of one end of one of the conveyors.

Figure 6 is a side elevation of Figure 5.

Figure 7 is a section on the line 7—7 of Figure 5.

Referring to the accompanying drawings, forming part of this specification, and in which like reference numerals designate like parts through the several views thereof, I designates the chassis of the truck, which is mounted upon the rear wheels 23 and front wheels (not shown) in the usual manner and is provided with a number of angle irons 24 on its upper surface upon which the portable carriers or bodies rest when loaded on the truck, the channels 25 being provided to accommodate the chains of the portable carriers shown and described in my pending application above referred to. Extending along the right side of the chassis I is a shaft 2 mounted in the bearings 3 and having a number of gear wheels 4 rigidly fixed to said shaft 2, and at the rear of the chassis I is a shaft 5 mounted in the bearings 6 and having two gear wheels 7 rigidly fixed thereto. On one end of the shaft 5 is a beveled gear 8 in mesh with the beveled gear 9 on the end of the shaft 2. On the opposite end of the shaft 2 is a beveled gear 10 in mesh with the beveled gear 11 on the shaft 12. The said shaft 12 is revolubly mounted in the chassis I and in the bearings 13. A worm wheel 14 is rigidly fixed on the shaft 12 and is in mesh with the worm 15 loosely mounted on the engine shaft 16. On the end of the engine shaft 16 is splined a clutch 17 having its ends adapted to fit into the recessed clutch face 18 on the engine shaft 16 and into the recessed clutch face 19 on the drive shaft 20. The clutch 17 is operated along the engine shaft 16 by means of a lever (not shown) conveniently located in the cab of the truck and connected to the end of the rod 21 which operates the lever 22 to throw the clutch in or out of engagement with the drive shaft 20 or in or out of engagement with the worm 15. The said worm 15 is loosely mounted on the shaft 16 and is held from moving sidewise on the shaft 16 by the collar 27. When it is desired to operate the shaft 2 the clutch 17 is moved to the position shown in Figure 3 of the drawings and the power from the engine shaft 16 will be transmitted through the shaft 12 to the shaft 2 and the shaft 5 at the rear of the chassis.

When it is desired to load or unload the truck with the portable carriers or bodies two of the conveyors are placed in position with their upper ends resting on the bearings 3 and the gear wheels 36 in mesh with the gear wheels 4 on the shaft 2. The engine is then started and the clutch 17 thrown in the position shown in Figure 3 of the drawings, which will cause the shaft 12, and consequently the shafts 2 and 5 to revolve. The gear wheels 36 being in mesh with the gear wheels 4 on the shaft 2 will cause the conveyor belt 32 to travel upwardly and as the ends of the Jan. 21, 1936.                    W. LUDOWICI                    2,028,228
                                  ROOFING TILE
                              Filed April 3, 1933              3 Sheets-Sheet 1
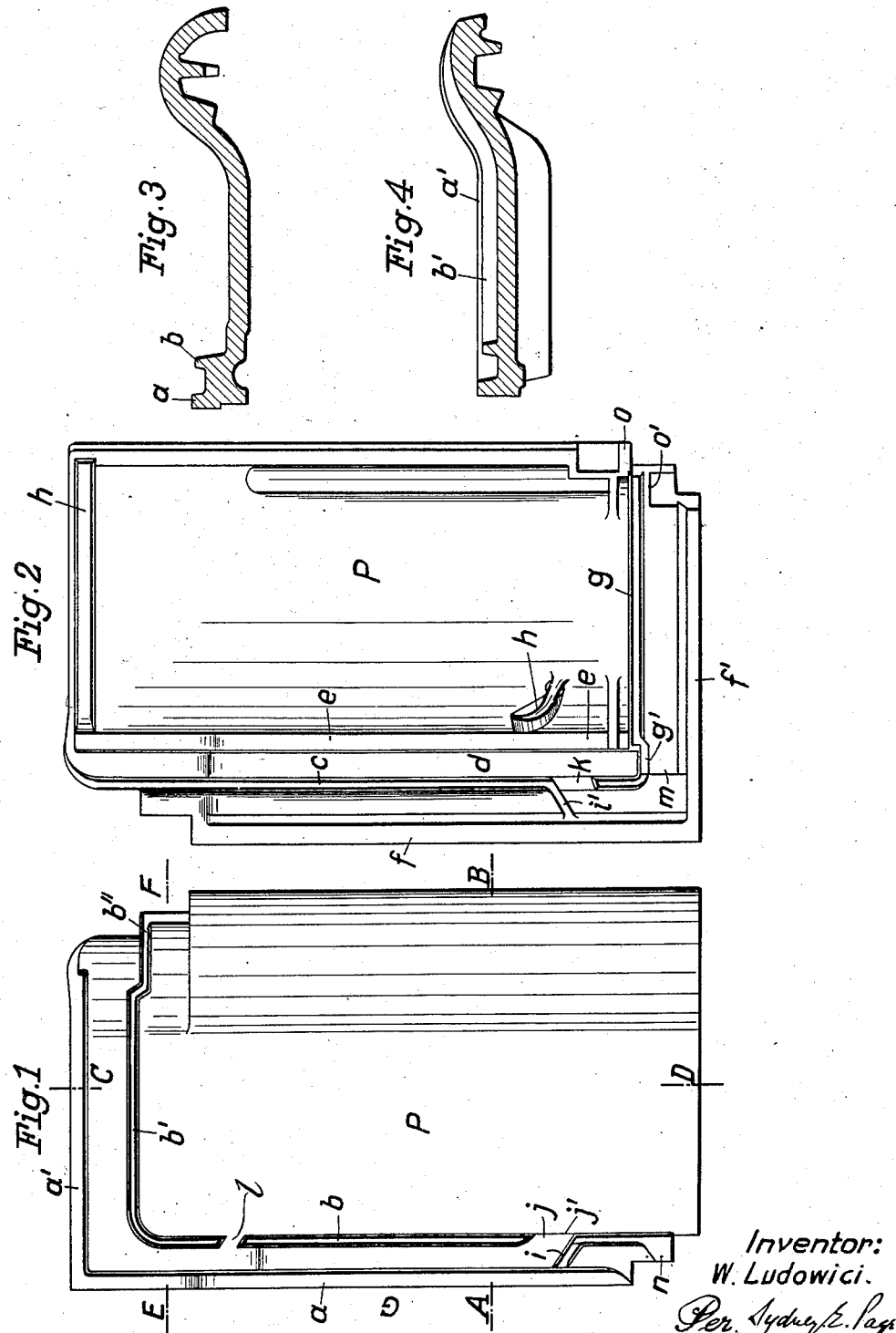

The conveyors for loading and unloading the truck are formed of angle irons 28 held together by a number of pins 29 upon each of which is revolubly mounted the spool-shaped rollers 30 the projections 31 thereof extending above the angle irons 28 and upon which the links of the conveyor belts 32 rest and travel. Secured to the forward ends of the angle irons 28 are the two pieces 33 in which is revolubly mounted the shaft 34. The said shaft 34 is provided with a sprocket wheel 35 for revolving the conveyor belt 32. On the outer end of the shaft 34 is a gear wheel 36 adapted to mesh with one of the gear wheels 4 on the shaft 2. The outer ends of the pieces 33 are each provided with a cut-out 37 leading to the circular opening 38. The cut outs 37 permit the ends of the conveyors to be slipped over the shaft 2 and moved sidewise until the openings 38 fit over the bearings 3 and the gear wheels 36 come into mesh with the gear wheels 4 on the shaft 2. The conveyors are provided with a foot 40 upon which the lower ends of the conveyors rest.